(12) United States Patent
Liu et al.

(10) Patent No.: US 12,637,288 B2
(45) Date of Patent: May 26, 2026

(54) TRANSPORTATION SYSTEM

(71) Applicant: Beijing Jingdong Qianshi Technology Co., Ltd., Beijing (CN)

(72) Inventors: Xu Liu, Beijing (CN); Weiquan He, Beijing (CN); Guoku Song, Beijing (CN); Zongjing Yu, Beijing (CN)

(73) Assignee: Beijing Jingdong Qianshi Technology Co., Ltd., Beijing (CN)

( * ) Notice: Subject to any disclaimer, the term of this patent is extended or adjusted under 35 U.S.C. 154(b) by 542 days.

(21) Appl. No.: 18/247,048

(22) PCT Filed: Oct. 9, 2021

(86) PCT No.: PCT/CN2021/122835
§ 371 (c)(1),
(2) Date: Mar. 28, 2023

(87) PCT Pub. No.: WO2022/078262
PCT Pub. Date: Apr. 21, 2022

(65) Prior Publication Data
US 2023/0373717 A1 Nov. 23, 2023

(30) Foreign Application Priority Data

Oct. 16, 2020 (CN) .......................... 202011114612.5

(51) Int. Cl.
*B65G 1/04* (2006.01)
*B65G 1/137* (2006.01)
(52) U.S. Cl.
CPC ......... B65G 1/0492 (2013.01); B65G 1/0478 (2013.01); B65G 1/1373 (2013.01)
(58) Field of Classification Search
CPC ... B65G 1/0492; B65G 1/0478; B65G 1/1373
See application file for complete search history.

(56) References Cited

U.S. PATENT DOCUMENTS 3,880,299 A * 4/1975 Zollinger ............... G06Q 10/08
414/273
4,007,843 A * 2/1977 Lubbers ............... B65G 1/0414
414/273
(Continued)

FOREIGN PATENT DOCUMENTS

| CN | 203714555 | 7/2014 |
| CN | 204606932 | 9/2015 |
(Continued)

OTHER PUBLICATIONS

Extended European Search Report, issued in the corresponding European patent application No. 21879307.3, dated Oct. 15, 2024, 7 pages.
(Continued)

*Primary Examiner* — Kyle O Logan
(74) *Attorney, Agent, or Firm* — HSML P.C.

(57) ABSTRACT

A transportation system, including: a transportation vehicle, multiple layers of rail structures, and a layer-switching lifting structure. The transportation vehicle is configured to transport an article. Each layer of rail structure of the multiple layers of rail structures includes a transverse rail and a longitudinal rail, and the transportation vehicle is configured to move in a storage region along each layer of rail structure to transport the article. The layer-switching lifting structure is arranged at a target position of each layer of rail structure, wherein the target position includes an intersection of the transverse rail and the longitudinal rail. The layer-switching lifting structure is configured to transfer the transportation vehicle between the multiple layers of rail structures, and the layer-switching lifting structure is further configured as a carrier for the transportation vehicle to change between the transverse rail and the longitudinal rail.

9 Claims, 4 Drawing Sheets

(56) References Cited

U.S. PATENT DOCUMENTS

| | | | | |
|---|---|---|---|---|
| 4,389,157 | A * | 6/1983 | Bernard, II | B65G 1/0435 |
| | | | | 414/280 |
| 9,771,217 | B2 * | 9/2017 | Lert | B65G 1/0485 |
| 11,904,705 | B2 * | 2/2024 | Grosse | B60L 3/0015 |
| 2010/0316468 | A1 * | 12/2010 | Lert | B65G 1/0485 |
| | | | | 414/273 |
| 2012/0195720 | A1 * | 8/2012 | Sullivan | B65G 1/04 |
| | | | | 414/277 |
| 2014/0205423 | A1 * | 7/2014 | Yamashita | B65G 1/1378 |
| | | | | 414/807 |
| 2016/0107838 | A1 * | 4/2016 | Swinkels | B65G 1/1373 |
| | | | | 414/273 |
| 2016/0236865 | A1 * | 8/2016 | Altemir | B65G 1/1378 |
| 2016/0355337 | A1 * | 12/2016 | Lert | B65G 1/0492 |
| 2017/0203921 | A1 * | 7/2017 | Issing | B65G 1/0407 |
| 2018/0086557 | A1 * | 3/2018 | Hall | B65G 1/06 |
| 2018/0208397 | A1 * | 7/2018 | Schack | B65G 1/1373 |
| 2019/0047788 | A1 * | 2/2019 | Winkler | B65G 1/0485 |
| 2023/0008035 | A1 * | 1/2023 | Hart | B65G 1/06 |
| 2023/0011746 | A1 * | 1/2023 | Turco | B65G 1/0492 |

FOREIGN PATENT DOCUMENTS

| | | |
|---|---|---|
| CN | 208666180 | 3/2019 |
| CN | 209853079 | 12/2019 |
| CN | 112340332 | 2/2021 |
| EP | 3872004 | 9/2021 |
| KR | 20160009365 | 1/2016 |

OTHER PUBLICATIONS

International Search Report and Written Opinion, issued in the corresponding PCT Application No. PCT/CN2021/122835, dated Dec. 16, 2021, 10 pages.

* cited by examiner

TRANSPORTATION SYSTEM

CROSS REFERENCE TO RELATED APPLICATION

This application is a Section 371 National Stage Application of International Application No. PCT/CN2021/122835, filed on Oct. 9, 2021, entitled "TRANSPORTATION SYSTEM", which claims priority to Chinese Patent No. 202011114612.5, filed on Oct. 16, 2020, the whole disclosure of which are incorporated herein by reference in their entirety.

TECHNICAL FIELD

The present disclosure relates to a field of warehousing and logistics, and in particular to a transportation system.

BACKGROUND

In the existing storage systems, articles are typically stored through a stereoscopic warehouse. The stereoscopic warehouse includes multiple layers of storage regions. In the related art, transportation vehicles operate in the multiple layers of storage regions to transport the articles. However, the related art has problems of high transportation cost and poor flexibility when transporting the articles through the transportation vehicles.

SUMMARY

In view of the above, the present disclosure provides an optimized transportation system.

In an aspect of the present disclosure, a transportation system is provided, including: a transportation vehicle configured to transport an article; multiple layers of rail structures, wherein each layer of rail structure of the multiple layers of rail structures includes a transverse rail and a longitudinal rail, and the transportation vehicle is configured to move in a storage region along each layer of rail structure to transport the article; and a layer-switching lifting structure arranged at a target position of each layer of rail structure, wherein the target position includes an intersection of the transverse rail and the longitudinal rail, wherein the layer-switching lifting structure is configured to transfer the transportation vehicle between the multiple layers of rail structures, and the layer-switching lifting structure is further configured as a carrier for the transportation vehicle to change between the transverse rail and the longitudinal rail.

According to the embodiments of the present disclosure, the layer-switching lifting structure includes: a frame structure arranged at the target position of each layer of rail structure; and a movable stage connected to the frame structure, wherein the movable stage is configured to move between the multiple layers of rail structures along the frame structure.

According to the embodiments of the present disclosure, the transportation vehicle is configured to travel to the movable stage and to be transferred between the multiple layers of rail structures via the movable stage.

According to the embodiments of the present disclosure, the layer-switching lifting structure at least includes a first layer-switching lifting structure and a second layer-switching lifting structure; wherein each layer of rail structure includes at least one transverse rail and two longitudinal rails, and the two longitudinal rails includes a first longitudinal rail and a second longitudinal rail; and wherein for each layer of rail structure, the transportation vehicle is configured to move from the first longitudinal rail in the layer of rail structure to the second longitudinal rail in the layer of rail structure via the first layer-switching lifting structure, the transverse rail in the layer of rail structure, and the second layer-switching lifting structure.

According to the embodiments of the present disclosure, the first layer-switching lifting structure includes: a first frame structure and a first movable stage, wherein the first frame structure is arranged at the target position of each layer of rail structure, and the first movable stage is connected to the first frame structure; and wherein the second layer-switching lifting structure includes: a second frame structure and a second movable stage, wherein the second frame structure is arranged at the target position of each layer of rail structure, and the second movable stage is connected to the second frame structure.

According to the embodiments of the present disclosure, for each layer of rail structure: the transportation vehicle moves from the first longitudinal rail in the layer of rail structure to the first movable stage, rotates by a preset angle in a first direction on the first movable stage, and then travels to the transverse rail in the layer of rail structure; and the transportation vehicle moves from the transverse rail in the layer of rail structure to the second movable stage, rotates by a preset angle in a second direction on the second movable stage, and then travels to the second longitudinal rail in the layer of rail structure.

According to the embodiments of the present disclosure, the above-mentioned transportation system further includes: a shelf structure forming a transverse roadway and a longitudinal roadway, wherein the transverse rail is arranged at the transverse roadway and connected to the shelf structure; and wherein the longitudinal rail is arranged at the longitudinal roadway and connected to the shelf structure.

According to the embodiments of the present disclosure, the above-mentioned transportation system further includes: a conveying line, wherein the conveying line includes a first end and a second end, the first end is connected to the shelf structure, and the conveying line is configured to transport the article from the transportation vehicle or to transport the article to the transportation vehicle; and a sorting station connected to the second end of the conveying line.

According to the embodiments of the present disclosure, the multiple layers of rail structures include at least a first layer of rail structure and a second layer of rail structure; wherein the transportation vehicle is configured to move based on a first mode, wherein the first mode includes moving on the first layer of rail structure to the second layer-switching lifting structure via the first layer-switching lifting structure, and transferring to the second layer of rail structure via the second layer-switching lifting structure; and wherein the transportation vehicle is configured to move based on a second mode, wherein the second mode includes transferring from the first layer of rail structure to the second layer of rail structure via the first layer-switching lifting structure, and moving on the second layer of rail structure to the second layer-switching lifting structure via the first layer-switching lifting structure.

According to the embodiments of the present disclosure, the above-mentioned transportation system further includes: a controller electrically connected to the transportation vehicle, the first layer-switching lifting structure and the second layer-switching lifting structure, wherein the controller is configured to acquire working states of the first layer-switching lifting structure and the second layer-switching lifting structure, and control, based on the working states, the transportation vehicle to move based on the first mode or the second mode.

According to the embodiments of the present disclosure, using the above-mentioned transportation system may at least partially solve the problems of high transportation cost and poor flexibility when transporting the article through the transportation vehicle in the related art, and thus may realize technical effects of optimizing a transportation function of the storage system, reducing the transportation cost and improving the transportation flexibility.

BRIEF DESCRIPTION OF THE DRAWINGS

The above and other objectives, features and advantages of the present disclosure will be more apparent through the following descriptions of embodiments of the present disclosure with reference to the accompanying drawings, in which.

DETAILED DESCRIPTION OF EMBODIMENTS

Embodiments of the present disclosure will be described below with reference to the accompanying drawings. However, it should be understood that these descriptions are merely exemplary and are not intended to limit the scope of the present disclosure. In the following detailed descriptions, for ease of explanation, numerous specific details are set forth in order to provide a comprehensive understanding of embodiments of the present disclosure. However, it is obvious that one or more embodiments may be implemented without these specific details. In addition, in the following descriptions, descriptions of well-known structures and technologies are omitted to avoid unnecessarily obscuring the concept of the present disclosure.

Terms used here are for the purpose of describing specific embodiments only, and are not intended to limit the present disclosure. "Comprising", "including" and other terms used here characterize a presence of a feature, a step, an operation and/or a component, but do not preclude a presence or addition of one or more other features, steps, operations or components.

All terms (including technical and scientific terms) used here have the same meanings as commonly understood by those skilled in the art, unless otherwise defined. It should be noted that the terms used here should be interpreted as have meanings consistent with the context of the present description and should not be interpreted in an idealized or overly rigid manner.

When expressions like "at least one of A, B, and C, etc." are used, they should generally be interpreted in accordance with the meaning of the expression as commonly understood by those skilled in the art (e.g., "a system having at least one of A, B and C" should include, but not be limited to, a system having A only, having B only, having C only, having A and B, having A and C, having B and C, and/or having A, B, C, etc.).

Embodiments of the present disclosure provide a transportation system, including: a transportation vehicle, multiple layers of rail structures and a layer-switching lifting structure. The transportation vehicle is configured to transport an article. Each layer of rail structure of the multiple layers of rail structures includes a transverse rail and a longitudinal rail, and the transportation vehicle is configured to move in a storage region along each layer of rail structure to transport the article. The layer-switching lifting structure is arranged at a target position of each layer of rail structure, and the target position includes an intersection of the transverse rail and the longitudinal rail. The layer-switching lifting structure is configured to transfer the transportation vehicle between the multiple layers of rail structures, and the layer-switching lifting structure is further configured as a carrier for the transportation vehicle to change between the transverse rail and the longitudinal rail.

Figure 1:
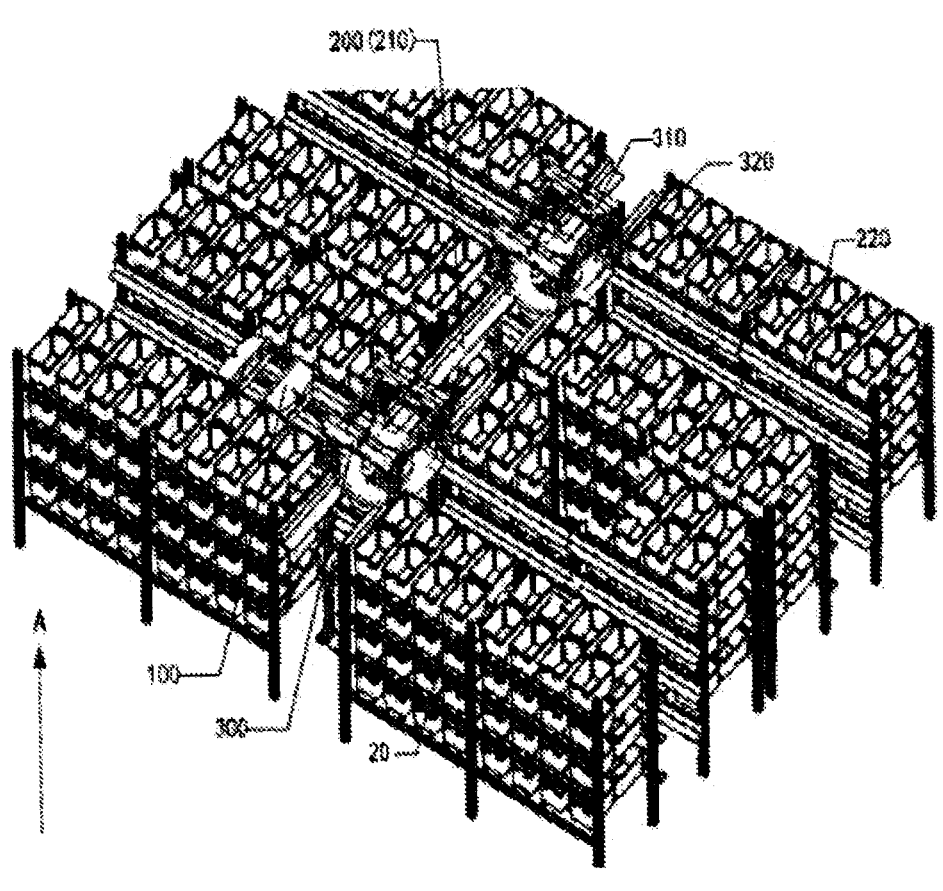
FIG. 1 schematically shows a three-dimensional structure diagram of a transportation system according to an embodiment of the present disclosure.

FIG. 1 schematically shows a three-dimensional structure diagram of a transportation system according to an embodiment of the present disclosure.

As shown in FIG. 1, a transportation system 10 in the embodiment of the present disclosure includes, for example, a transportation vehicle 100, multiple layers of rail structures 200, and a layer-switching lifting structure 300.

In embodiments of the present disclosure, the transportation vehicle 100 may be a shuttle vehicle which may be used to transport an article 20. The transportation vehicle 100 may move in a warehouse to reach a corresponding storage region in the warehouse to transport the article 20.

In embodiments of the present disclosure, the multiple layers of rail structures 200 are distributed in a vertical direction A, and each layer of rail structure 200 is, for example, located on a horizontal plane. Each layer of rail structure 200 in the multiple layers of rail structure 200 includes a transverse rail 210 and a longitudinal rail 220. The transverse rail 210 is, for example, perpendicular to the longitudinal rail 220. The transportation vehicle 100 may move in a storage region along each layer of rail structure 200 to transport the article 20.

For example, the warehouse includes multiple layers of storage regions, and each layer of storage region is provided with a layer of rail structure 200. For each layer of rail structure 200, the layer of rail structure 200 is arranged on the layer of storage region, and the transportation vehicle 100 may move to various locations of the layer of storage region via the layer of rail structure 200 so as to transport the article 20.

According to embodiments of the present disclosure, the layer-switching lifting structure 300 is, for example, arranged at a target position of each layer of rail structure 200, and the target position includes an intersection of the transverse rail 210 and the longitudinal rail 220.

In an example, the layer-switching lifting structure 300 is configured to transfer the transportation vehicle 100 between the multiple layers of rail structures 200. For example, the transportation vehicle 100 may move to the layer-switching lifting structure 300, and the transportation vehicle 100 may be transferred between the multiple layers of rail structures 200 by a lifting movement of the layer-switching lifting structure 300 in the vertical direction A. For example, when the transportation vehicle 100 is located on a layer of rail structure 200, the transportation vehicle 100 may travel to the layer-switching lifting structure 300, and the transportation vehicle 100 may be transferred to another layer of rail structure 200 by the lifting movement of the layer-switching lifting structure 300 in the vertical direction A.

In another example, the layer-switching lifting structure 300 is further configured as a carrier for the transportation vehicle 100 to change between the transverse rail 210 and the longitudinal rail 220. For example, for each layer of rail structure 200, the layer of rail structure 200 includes the transverse rail 210 and the longitudinal rail 220. When the transportation vehicle 100 moves between the transverse rail 210 and the longitudinal rail 220 in the layer of rail structure 200, a movement direction thereof may be changed by the layer-switching lifting structure 300.

For example, when the transportation vehicle 100 needs to move from the transverse rail 210 to the longitudinal rail 220, the transportation vehicle 100 may move from the transverse rail 210 to the layer-switching lifting structure 300, and rotate around a center of a vehicle body of the transportation vehicle 100 on the layer-switching lifting structure 300 (for example, rotate by 90 degrees), and the rotated transportation vehicle 100 moves from the layer-switching lifting structure 300 to the longitudinal rail 220. Alternatively, when the transportation vehicle 100 needs to move from the longitudinal rail 220 to the transverse rail 210, the transportation vehicle 100 may move from the longitudinal rail 220 to the layer-switching lifting structure 300, and rotate around the center of the vehicle body of the transportation vehicle 100 on the layer-switching lifting structure 300 (for example, rotate by 90 degrees), and the rotated transportation vehicle 100 may move from the layer-switching lifting structure 300 to the transverse rail 210.

Therefore, in embodiments of the present disclosure, by providing the layer-switching lifting structure at the intersection of the transverse rail and the longitudinal rail, so that the layer-switching lifting structure does not need to occupy an additional space of the warehouse, which may save an area of the warehouse, increase a storage density of the warehouse, improve a space utilization rate, and thereby improving a transportation efficiency. In addition, the layer-switching lifting structure may be used as the carrier for the transportation vehicle to change between the transverse rail and the longitudinal rail, so that it is not necessary to provide a special rail-changing structure in each layer of rail structure. For example, it is not necessary to provide a special rail-changing rail in each rail structure, which may greatly save the cost of the transportation system and improve the space utilization rate.

In another example of the present disclosure, the layer-switching lifting structure 300 includes, for example, a frame structure 310 and a movable stage 320.

The frame structure 310 is arranged at the target position of each layer of rail structure 200, and the target position is the intersection of the transverse rail 210 and the longitudinal rail 220. The frame structure 310 may include a plurality of column structures, and each column structure is, for example, arranged in the vertical direction A.

The movable stage 320 is, for example, connected to the frame structure 310, and the movable stage 320 is configured to move between the multiple layers of rail structures 200 along the frame structure 310. That is, the movable stage 320 may perform a lifting movement in the vertical direction A along the plurality of column structures.

In embodiments of the present disclosure, the transportation vehicle 100 may travel to the movable stage 320 and may be transferred between the multiple layers of rail structures 200 through the movable stage 320. For example, the transportation vehicle 100 may travel to the movable stage 320 and may be transferred from a layer of rail structure 200 to another layer of rail structure 200 through the lifting movement of the movable stage 320.

In addition, after the transportation vehicle 100 moves to the movable stage 320, the transportation vehicle 100 may rotate around the center of the vehicle body of the transportation vehicle 100 on the movable stage 320 (for example, rotate by 90 degrees), and the rotated transportation vehicle 100 moves from the movable stage 320 to the rail structure 200, so as to realize a rail change of the transportation vehicle 100 between the transverse rail 210 and the longitudinal rail 220 through the movable stage 320.

Figure 2:
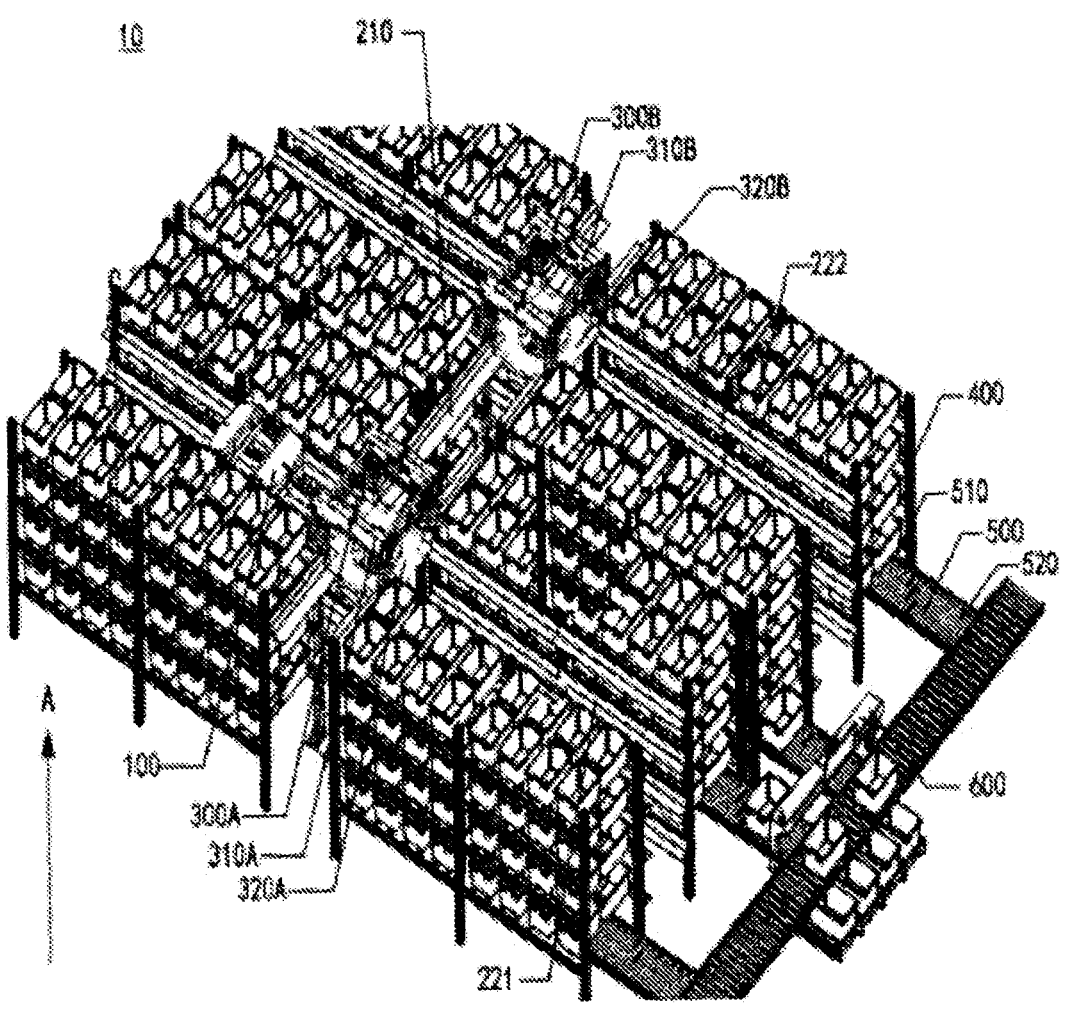
FIG. 2 schematically shows a three-dimensional structure diagram of a transportation system according to another embodiment of the present disclosure.

FIG. 2 schematically shows a three-dimensional structure diagram of a transportation system according to another embodiment of the present disclosure.

As shown in FIG. 2, the layer-switching lifting structure 300 may include, for example, a plurality of layer-switching lifting structures 300. In an example, the layer-switching lifting structure 300 includes, for example, a first layer-switching lifting structure 300A and a second layer-switching lifting structure 300B.

In embodiments of the present disclosure, each layer of rail structure 200 includes at least one transverse rail 210 and two longitudinal rails 220, and the two longitudinal rails 220 include, for example, a first longitudinal rail 221 and a second longitudinal rail 222. For example, the first longitudinal rail 221 and the second longitudinal rail 222 are parallel to each other, the transverse rail 210 is perpendicular to the first longitudinal rail 221, and the transverse rail 210 is perpendicular to the second longitudinal rail 222.

In embodiments of the present disclosure, the first layer-switching lifting structure 300A includes, for example, a first frame structure 310A and a first movable stage 320A. The first frame structure 310A is arranged at the target position of each layer of rail structure 200, and the first movable stage 320A is connected to the first frame structure 310A.

In embodiments of the present disclosure, the second layer-switching lifting structure 300B includes, for example, a second frame structure 310B and a second movable stage 320B. The second frame structure 310B is arranged at the target position of each layer of the rail structure 200, and the second movable stage 320B is connected to the second frame structure 310B.

Figure 3:
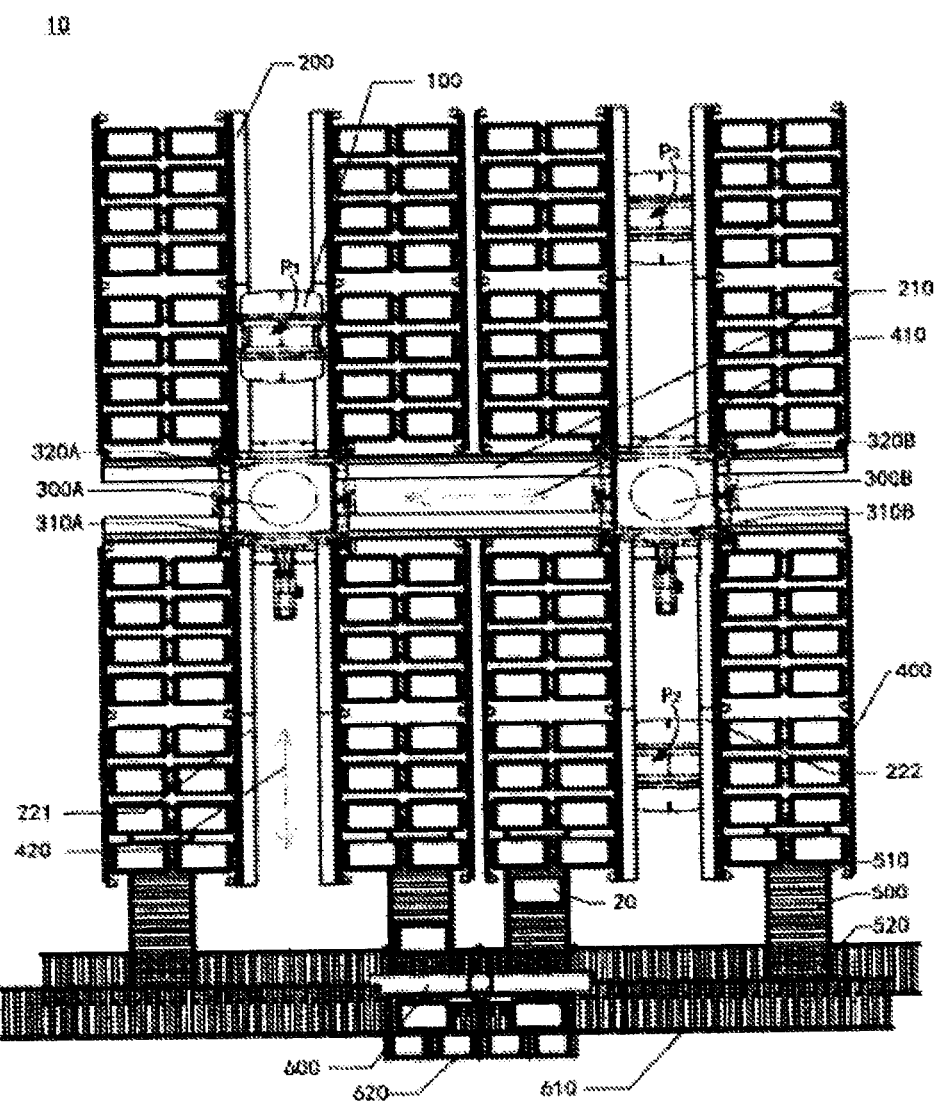
FIG. 3 schematically shows a plane structure diagram of a transportation system according to an embodiment of the present disclosure.

FIG. 3 schematically shows a plane structure diagram of a transportation system according to an embodiment of the present disclosure.

As shown in FIG. 3, for each layer of rail structure 200, the transportation vehicle 100 may, for example, move from the first longitudinal rail 221 in the layer of rail structure 200 to the second longitudinal rail 222 in the layer of rail structure 200 via the first layer-switching lifting structure 300A, the transverse rail 210 in the layer of rail structure 200, and the second layer-switching lifting structure 300B.

In embodiments of the present disclosure, for each layer of rail structure 200, the transportation vehicle 100 moves from the first longitudinal rail 221 in the layer of rail structure 200 to the first movable stage 320A, and rotates by a preset angle in a first direction on the first movable stage 320A, and then travels to the transverse rail 210 in the layer of rail structure 200. Then, the transportation vehicle 100 moves from the transverse rail 210 in the layer of rail structure 200 to the second movable stage 320B, and rotates by a preset angle in a second direction on the second movable stage 320B, and then travels to the second longitudinal rail 222 in the layer of rail structure 200. In an example, the first direction may be clockwise or counterclockwise, the second direction may be clockwise or counterclockwise, and the preset angle may be 90 degrees.

In an example, the first direction and the second direction may be different. As shown in FIG. 3, when the transportation vehicle 100 needs to move from a position $P_1$ of the first longitudinal rail 221 to a position $P_2$ of the second longitudinal rail 222, the transportation vehicle 100 travels to the first movable stage 320A, rotates by the preset angle (such as 90 degrees) in the first direction (such as counterclockwise direction) on the first movable stage 320A, and then travels to the transverse rail 210. Then, the transportation vehicle 100 moves from the transverse rail 210 to the second movable stage 320B, rotates by the preset angle (such as 90 degrees) in the second direction (such as clockwise direction) on the second movable stage 320B, and then travels to the position $P_2$ of the second longitudinal rail 222. At this time, the first direction is counterclockwise, and the second direction is clockwise, and the first direction is different from the second direction.

In another example, the first and second directions may be the same. As shown in FIG. 3, when the transportation vehicle 100 needs to move from the position $P_1$ of the first longitudinal rail 221 to a position $P_3$ of the second longitudinal rail 222, the transportation vehicle 100 travels to the first movable stage 320A, rotates by the preset angle (such as 90 degrees) in the first direction (such as counterclockwise direction) on the first movable stage 320A, and then travels to the transverse rail 210. Then, the transportation vehicle 100 moves from the transverse rail 210 to the second movable stage 320B, rotates by the preset angle (such as 90 degrees) in the second direction (such as counterclockwise direction) on the second movable stage 320B, and then travels to the position $P_3$ of the second longitudinal rail 222. At this time, the first direction and the second direction are both counterclockwise, that is, the first direction and the second direction are the same.

As shown in FIG. 3, the transportation system 10 in embodiments of the present disclosure may further include a shelf structure 400. The shelf structure 400 forms, for example, a transverse roadway 410 and a longitudinal roadway 420.

In embodiments of the present disclosure, the transverse rail 210 is, for example, arranged at the transverse roadway 410 and connected to the shelf structure 400, and the longitudinal rail 220 is, for example, arranged at the longitudinal roadway 420 and connected to the shelf structure 400.

For example, each transverse rail 210 is arranged on two sides of the transverse roadway 410, and each longitudinal rail 220 is arranged on two sides of the longitudinal roadway 420.

As shown in FIG. 2 and FIG. 3, the transportation system 10 in embodiments of the present disclosure may further include a conveying line 500 and a sorting station 600.

In embodiments of the present disclosure, the conveying line 500 is used to transport the article 20 from the transportation vehicle 100, or transport the article 20 from the storage region in the warehouse to the transportation vehicle 100. For example, when the article 20 exits the warehouse, the article 20 may be transported to the conveying line 500 by the transportation vehicle 100. When the article 20 enters the warehouse, the article 20 on the conveying line 500 is transported by the transportation vehicle 100 to the storage region in the warehouse for storage.

In an example, the conveying line 500 may include many conveying lines, and each conveying line 500 includes, for example, a first end 510 and a second end 520. For example, the first end 510 is connected to the shelf structure 400, and the second end 520 is connected to the sorting station 600.

In another example, for example, the conveying line 500 includes, an upper conveying line and a lower conveying line, and the sorting station 600 includes an upper sorting position 610 and a lower sorting position 620. For example, the upper conveying line is used for transporting the article 20 to realize the enter and the exit of the article 20. The first end 510 of the upper conveying line is connected to the shelf structure 400, and the second end 520 of the upper conveying line is connected to the upper sorting position 610. The lower conveying line is used to transport an order box obtained from sorting article 20 to the lower sorting position 620, which is convenient for transporting the order box to a packing table for packaging.

Figure 4:
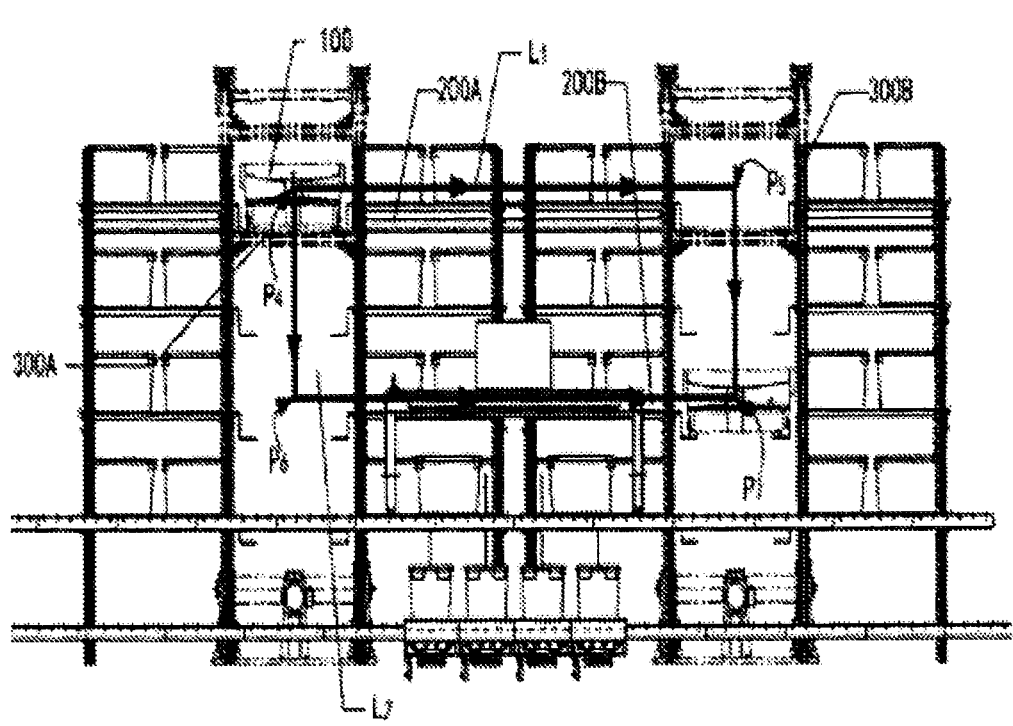
FIG. 4 schematically shows a schematic diagram of performing an operation through a transportation system according to an embodiment of the present disclosure.

FIG. 4 schematically shows a schematic diagram of performing an operation through a transportation system according to an embodiment of the present disclosure.

As shown in FIG. 4, the multiple layers of rail structures 200 in the embodiment of the present disclosure include, for example, at least a first layer of rail structure 200A and a second layer of rail structure 200B.

The transportation vehicle 100 may move based on a first mode or a second mode.

In an example, the first mode includes moving on the first layer of rail structure 200A from the first layer-switching lifting structure 300A to the second layer-switching lifting structure 300B, and transferring to the second layer of rail structure 200B via the second layer-switching lifting structure 300B. Since the first layer-switching lifting structure 300A and the second layer-switching lifting structure 300B are located in different roadways, the first mode is a movement mode of first crossing the roadway first and then switching the layer.

For example, when the transportation vehicle 100 needs to move from a position $P_4$ of the first layer of rail structure 200A to a position $P_7$ of the second layer of rail structure 200B, the transportation vehicle 100 may travel on the first layer of rail structure 200A from the first layer-switching lifting structure 300A to a position $P_5$ of the second layer-switching lifting structure 300B, and the transportation vehicle 100 is transferred to the position $P_7$ of the second layer of rail structure 200B through a lifting movement of the second layer-switching lifting structure 300B. A movement route $L_1$ of the transportation vehicle 100 based on the first mode is shown in the drawing.

In another example, the second mode includes transferring from the first layer of rail structure 200A to the second layer of rail structure 200B via the first layer-switching lifting structure 300A, and moving on the second layer of rail structure 200B from the first layer-switching lifting structure 300A to the second layer-switching lifting structure 300B. Since the first layer-switching lifting structure 300A and the second layer-switching lifting structure 300B are located in different roadways, the second mode is a movement mode of first switching the layer and then crossing the roadway.

For example, when the transportation vehicle 100 needs to move from the position $P_4$ of the first layer of rail structure 200A to the position $P_7$ of the second layer of rail structure 200B, the transportation vehicle 100 may be transferred to a position $P_6$ of the second layer of rail structure 200B through a lifting movement of the first layer-switching lifting structure 300A, and then move on the second layer of rail structure 200B from the position $P_6$ of the first layer-switching lifting structure 300A to the position $P_7$ of the second layer-switching lifting structure 300B. A movement route $L_2$ of the transportation vehicle 100 based on the second mode is shown in the drawing.

In embodiments of the present disclosure, the transportation system 10 may include a controller, and the controller is, for example, electrically connected to the transportation vehicle 100, the first layer-switching lifting structure 300A, and the second layer-switching lifting structure 300B.

The controller may be used to acquire working states of the first layer-switching lifting structure 300A and the second layer-switching lifting structure 300B, and control the transportation vehicle 100 to move based on the first mode or the second mode based on the working states.

For example, when the transportation vehicle 100 needs to move from the position $P_4$ of the first layer of rail structure 200A to the position $P_7$ of the second layer of rail structure 200B, if the first layer-switching lifting structure 300A is currently in a busy state, the first mode, that is, first crossing the roadway and then switching the layer may be adopted to perform the operation, which avoids a time waste due to waiting for the first layer-switching lifting structure 300A.

It may be seen that, in the embodiment of the present disclosure, the first mode or the second mode is selected to perform operation based on the working states of the layer-switching lifting structures, which realizes determining the operation mode based on the idle state or busy state of the layer-switching lifting structures, so that the scheduling of the operation becomes more flexible and more efficient.

Those skilled in the art will appreciate that features recited in the various embodiments and/or the claims of the present disclosure may be combined and/or incorporated in a variety of ways, even if such combinations or incorporations are not clearly recited in the present disclosure. In particular, the features recited in the various embodiments and/or the claims of the present disclosure may be combined and/or incorporated in a variety of ways without departing from the spirit and teachings of the present disclosure. All such combinations and/or incorporations fall within the scope of the present disclosure.

Embodiments of the present disclosure have been described above. However, these embodiments are for illustrative purposes only, and are not intended to limit the scope of the present disclosure. Although the various embodiments have been described above separately, this does not mean that the measures in the various embodiments may not be advantageously used in combination. The scope of the present disclosure is defined by the appended claims and their equivalents. Without departing from the scope of the present disclosure, those skilled in the art may make various substitutions and modifications, and these substitutions and modifications should all fall within the scope of the present disclosure.

What is claimed is:

1. A transportation system, comprising:
a transportation vehicle configured to transport an article;
multiple layers of rail structures, wherein each layer of rail structure of the multiple layers of rail structures comprises a transverse rail and a longitudinal rail, and the transportation vehicle is configured to move in a storage region along each layer of rail structure to transport the article; and
a layer-switching lifting structure arranged at a target position of each layer of rail structure, wherein the target position comprises an intersection of the transverse rail and the longitudinal rail,
wherein the layer-switching lifting structure is configured to transfer the transportation vehicle between the multiple layers of rail structures, and the layer-switching lifting structure is further configured as a carrier for the transportation vehicle to change between the transverse rail and the longitudinal rail;
wherein the layer-switching lifting structure at least comprises a first layer-switching lifting structure and a second layer-switching lifting structure; wherein each layer of rail structure comprises at least one transverse rail and two longitudinal rails, and the two longitudinal rails comprise a first longitudinal rail and a second longitudinal rail;
wherein for each layer of rail structure, the transportation vehicle is configured to move from the first longitudinal rail in the layer of rail structure to the second longitudinal rail in the layer of rail structure via the first layer-switching lifting structure, the transverse rail in the layer of rail structure, and the second layer-switching lifting structure; and
wherein the transportation system further comprises: a controller electrically connected to the transportation vehicle, the first layer-switching lifting structure and the second layer-switching lifting structure, wherein the controller is configured to acquire working states of the first layer-switching lifting structure and the second layer-switching lifting structure, and control, based on the working states, an operation of the transportation vehicle.

2. The transportation system according to claim 1, wherein the layer-switching lifting structure comprises:
a frame structure arranged at the target position of each layer of rail structure; and
a movable stage connected to the frame structure, wherein the movable stage is configured to move between the multiple layers of rail structures along the frame structure.

3. The transportation system according to claim 2, wherein the transportation vehicle is configured to travel to the movable stage and to be transferred between the multiple layers of rail structures via the movable stage.

4. The transportation system according to claim 1, wherein the first layer-switching lifting structure comprises: a first frame structure and a first movable stage, wherein the first frame structure is arranged at the target position of each layer of rail structure, and the first movable stage is connected to the first frame structure; and
wherein the second layer-switching lifting structure comprises: a second frame structure and a second movable stage, wherein the second frame structure is arranged at the target position of each layer of rail structure, and the second movable stage is connected to the second frame structure.

5. The transportation system according to claim 4, wherein for each layer of rail structure:
the transportation vehicle moves from the first longitudinal rail in the layer of rail structure to the first movable stage, rotates by a preset angle in a first direction on the first movable stage, and then travels to the transverse rail in the layer of rail structure; and
the transportation vehicle moves from the transverse rail in the layer of rail structure to the second movable stage, rotates by a preset angle in a second direction on the second movable stage, and then travels to the second longitudinal rail in the layer of rail structure.

6. The transportation system according to claim 1, further comprising:
a shelf structure forming a transverse roadway and a longitudinal roadway, wherein the transverse rail is arranged at the transverse roadway and connected to the shelf structure; and wherein the longitudinal rail is arranged at the longitudinal roadway and connected to the shelf structure.

7. The transportation system according to claim 6, further comprising:

a conveying line, wherein the conveying line comprises a first end and a second end, the first end is connected to the shelf structure, and the conveying line is configured to transport the article from the transportation vehicle or to transport the article to the transportation vehicle; and a sorting station connected to the second end of the conveying line.

8. The transportation system according to claim 4, wherein the multiple layers of rail structures comprise at least a first layer of rail structure and a second layer of rail structure;

wherein the transportation vehicle is configured to move based on a first mode, wherein the first mode comprises moving on the first layer of rail structure to the second layer-switching lifting structure via the first layer-switching lifting structure, and transferring to the second layer of rail structure via the second layer-switching lifting structure; and wherein the transportation vehicle is configured to move based on a second mode, wherein the second mode comprises transferring from the first layer of rail structure to the second layer of rail structure via the first layer-switching lifting structure, and moving on the second layer of rail structure to the second layer-switching lifting structure via the first layer-switching lifting structure.

9. The transportation system according to claim 8, wherein the controller is configured to acquire working states of the first layer-switching lifting structure and the second layer-switching lifting structure, and control, based on the working states, an operation of the transportation vehicle comprises:

control, based on the working states, the transportation vehicle to move based on the first mode or the second mode.

* * * * *